(12) United States Patent
Sekine et al.

(10) Patent No.: US 8,635,623 B2
(45) Date of Patent: Jan. 21, 2014

(54) MULTI-LAYER PRINT WORKFLOW ARCHITECTURE JOB TICKET GENERATION UTILIZING USER SELECTABLE REAL-TIME DEVICE CAPABILITIES

(75) Inventors: Hitoshi Sekine, Los Altos, CA (US); David A. Williams, San Jose, CA (US); Kurt Knodt, Los Altos, CA (US); Yue Liu, San Jose, CA (US); Ronald Marc Conescu, Mountain View, CA (US); Loc T. Le, San Jose, CA (US)

(73) Assignee: Ricoh Company, Ltd, Tokyo (JP)

( * ) Notice: Subject to any disclaimer, the term of this patent is extended or adjusted under 35 U.S.C. 154(b) by 1366 days.

(21) Appl. No.: 12/118,106

(22) Filed: May 9, 2008

(65) Prior Publication Data

US 2009/0282412 A1 Nov. 12, 2009

(51) Int. Cl.
*G06F 9/46* (2006.01)
*G06F 13/00* (2006.01)
*G06F 3/12* (2006.01)
*G05B 11/01* (2006.01)

(52) U.S. Cl.
USPC .......... 718/104; 718/102; 711/165; 358/1.13; 358/1.15; 700/19

(58) Field of Classification Search
None
See application file for complete search history.

(56) References Cited

U.S. PATENT DOCUMENTS

| | | | |
|---|---|---|---|
| 6,556,875 B1 * | 4/2003 | Nagasaka et al. | 700/19 |
| 6,573,910 B1 | 6/2003 | Duke et al. | |
| 6,825,943 B1 | 11/2004 | Barry et al. | |
| 2001/0013947 A1 * | 8/2001 | Van Der Linden et al. | 358/1.15 |
| 2002/0071134 A1 | 6/2002 | Jackson | |
| 2003/0041765 A1 | 3/2003 | Hill | |
| 2003/0061178 A1 | 3/2003 | Ogawa | |
| 2004/0006522 A1 | 1/2004 | Keane | |
| 2004/0111430 A1 | 6/2004 | Hertling | |
| 2004/0184061 A1 | 9/2004 | Christiansen | |
| 2004/0196470 A1 | 10/2004 | Christiansen | |
| 2004/0196493 A1 | 10/2004 | Christiansen | |
| 2005/0065830 A1 | 3/2005 | Kuke et al. | |
| 2005/0096770 A1 | 5/2005 | Chua | |
| 2005/0151993 A1 | 7/2005 | Gartstein | |
| 2005/0179921 A1 * | 8/2005 | Brossman et al. | 358/1.13 |
| 2006/0114493 A1 | 6/2006 | Slightam et al. | |
| 2007/0245110 A1 * | 10/2007 | Shibayama et al. | 711/165 |
| 2012/0057191 A1 | 3/2012 | Gnanasambandam | |

FOREIGN PATENT DOCUMENTS

| | | |
|---|---|---|
| JP | 2007-226391 | 9/2007 |
| JP | 2008-015917 | 1/2008 |

* cited by examiner

*Primary Examiner* — Meng An
*Assistant Examiner* — Bing Zhao
(74) *Attorney, Agent, or Firm* — Duft Bornsen & Fettig LLP

(57) ABSTRACT

A multi-layer workflow architecture for a print shop is disclosed. The workflow architecture includes a workflow front end, service bus, and service providers. The workflow front end provides an interface to print shop operators. The service providers are each associated with a device in the print shop. The service bus represents the layer between the workflow front end and the service providers. In operation, the service providers report device capabilities for devices to the service bus. The workflow front end receives the device capabilities from the service bus, and provides the device capabilities to a user to allow the user to define a job ticket based on the device capabilities. The service bus identifies the processes defined in the job ticket, and identifies the service providers operable to provide the processes. The service bus then routes process messages to the identified service providers to execute the processes on the devices.

20 Claims, 7 Drawing Sheets

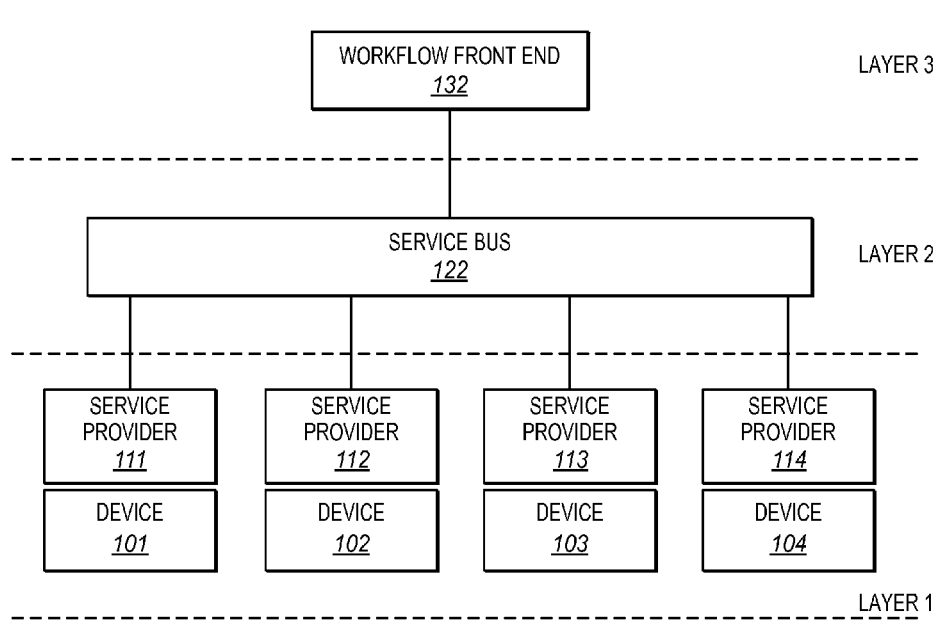
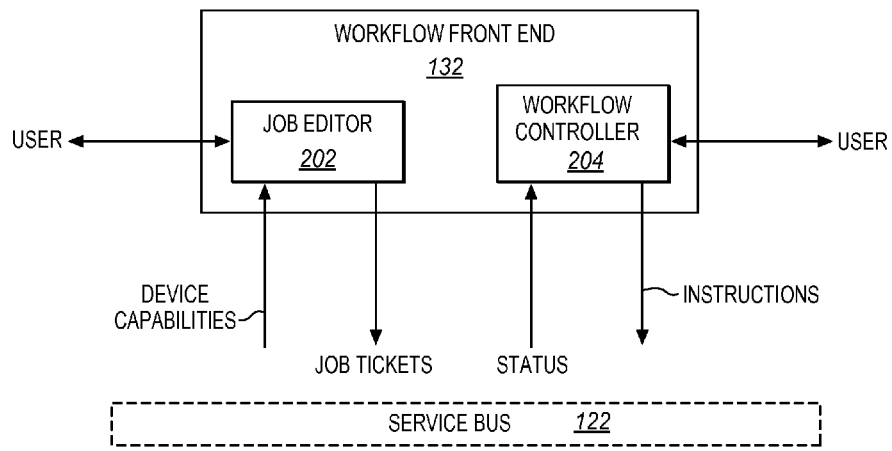

MULTI-LAYER PRINT WORKFLOW ARCHITECTURE JOB TICKET GENERATION UTILIZING USER SELECTABLE REAL-TIME DEVICE CAPABILITIES

BACKGROUND

1. Field of the Invention

The invention relates to the field of printing and, in particular, to workflow architectures for printing systems, such as a print shop, having a multi-layer platform for handling workflows.

2. Discussion of Related Art

A print shop generally refers to a workplace where printing is performed, typically to provide commercial printing services. Customers use print shops to print catalogs, manuals, books, magazines, brochures, etc. Print shops may be large production print shops that implement large inline printers (i.e., continuous feed printers) to print long run-length jobs for a few customers. For example, a large production print shop may print customer bills for a credit card company. Most print shops are smaller shops that print short run-length jobs for many different customers. For example, a small print shop may print magazines, catalogs, books, brochures, etc, for a variety of different customers.

Because most small print shops service many different customers, the small print shops have to be able to change their workflow and system configuration to handle different jobs. A workflow generally refers to some organization of resources, devices, and roles in a print shop for providing printing services. For example, a small print shop may include a black and white printer, a color printer, a cutting device, and a binding device. For a workflow of one customer, the print shop may use the color printer and the cutting device to generate brochures for this customer. For a workflow of another customer, the print shop may use the color printer, the black and white printer, the cutting device, and the binding device to generate books for this customer. Due to the needed flexibility of the small print shops and the cost of new, large inline devices, many of the devices in the print shop are either offline devices or near-line devices as opposed to inline devices. Thus, to switch configurations quickly to handle different types of jobs, the small print shop does not need to re-configure an inline system, but may instead use the offline devices or near-line devices.

The workflow architecture of a print shop is the platform upon which a job is created or generated, and then subsequently executed on the devices in the print shop. The typical workflow architecture as presently practiced comprises software that is run on one or more computers in the print shop. The software is customized for each print shop based on the particular devices used in the print shop and the type of jobs that will be handled in the print shop. For instance, if a print shop has two printers from two different vendors and a cutting device from another vendor, then the customized software for that print shop is programmed based on those specific devices being used.

The customized software allows a print shop operator to create one or more jobs, manage the jobs, schedule the jobs, etc. To provide such functionality, the operating parameters, capabilities, and other information for each of the devices (i.e., the printers, cutting devices, binding devices, etc) in the print shop are defined in the customized software. The customized software may provide a job editor that displays the devices in the print shop and their associated, pre-defined capabilities to the print shop operator. The print shop operator may then create a job by selecting one or more devices in the print shop, and by defining the processes to be executed by each of the devices for the job. For instance, the print shop operator may first select a color printer to print a particular printable file (e.g., a PDF file) to generate printed pages. The print shop operator may then select a folding device to put one or more creases in the printed pages to generate brochures.

When the job and an associated job ticket are created through the job editor, the customized software transmits the job ticket to the devices selected for the job. The job ticket indicates what printable files are needed for the job (if any), and what process(es) should be executed on that particular device.

One problem with present workflow architectures for print shops is that the architecture is inflexible. If a new device is added to the print shop, then the customized software either needs to be replaced with new software that is programmed with the capabilities and operating parameters of the new device. If an existing device in the print shop is upgraded or otherwise changed, then the customized software likewise needs to be replaced with new software that is programmed with the new capabilities and operating parameters of the existing device. Replacing the customized software in a print shop can be expensive and inefficient.

SUMMARY

Embodiments of the present invention solve the above and other related problems with a multilayer workflow architecture, such as for print shops. The workflow architecture as described herein includes a workflow front end as one layer, a service bus as another layer, and service providers as another layer. The workflow front end represents the layer that provides the interface to operators or users. For instance, the workflow front end may provide a job editor for creating job tickets, a workflow controller for managing the execution of the job tickets, etc. The service providers represent the layer at the device-level. The service providers are each associated with a device, such as in a print shop, that is able to execute a process defined in a job ticket, such as a printing process, a cutting process, a binding process, etc. The service providers store device capabilities of the devices, and execute processes using the devices as defined in a job ticket. Although the term "device" commonly refers to a mechanical device operable to perform a process, the term "device" as used herein may also refer to humans that are able to perform processes. The service bus represents the layer between the workflow front end and the service providers, and operates to manage the jobs for execution.

The service providers are operable to store the device capabilities for the device with which they are associated, and report the device capabilities to the service bus. For instance, a service provider for a color printer may store device capabilities indicating that the color printer has certain types of paper stock, is able to print 1-up, 2-up, 4-up, etc, is able to print two sided copies, is able to sort pages, is able to staple pages, or is able to provide other services or features. The service bus is operable to receive the device capabilities from the service providers for each of the devices, and integrate the device capabilities, such as in a device capability file. The workflow front end is operable to receive the device capabilities from the service bus, and to provide or display the device capabilities to a user to allow the user to define a job ticket based on the device capabilities of the devices. For instance, the workflow front end may provide a job editor which allows a user to define a job ticket based on the device capabilities of the devices as represented by the service providers. Responsive to input from the user, the workflow front end generates a job ticket. The job ticket defines one or more processes to be performed on or by the devices, such as a printing process, a cutting process, a binding process, etc. The job ticket is thus a subset of the device capabilities that are available from the devices.

The workflow front end is further operable to transmit the job ticket to the service bus for execution. The service bus is further operable to process the job ticket to identify the processes defined in the job ticket, and to identify the service providers operable to provide or execute the processes. The service bus is further operable to generate process messages indicating the processes to be performed, and route the process messages to the identified service providers. Each of the service providers is further operable to receive a process message, and to execute the requested process on its associated device responsive to the process message. For example, the service providers are further operable to convert a process message into device-specific operational commands in the format compatible with its associated device, and to transmit the device-specific operational commands to its associated device to execute the process.

In some embodiments, the service providers are operable to identify the status of the processes, and transmit the status of the processes to the service bus. The service bus is operable to transmit the status of the processes to the workflow front end. The workflow front end is operable to provide the status of the processes to a user. The user may modify the job ticket based on the status of the processes through the workflow front end. Alternatively, the service bus may be operable to modify the job ticket based on the status of the processes to replace one of the devices identified to perform a process with another device.

The workflow architecture described above provides flexibility to allow devices to be efficiently added to the architecture and to allow existing devices to be changed in an efficient manner. If a new device is added, then the service provider associated with the device will report the device capabilities of the new device to the service bus. The service bus will in turn report the device capabilities of the new device to the workflow front end. Thus, the new device will be available to a user for creating a new job ticket because its capabilities were reported to the service bus and the workflow front end. Similarly, if an existing device is changed, the service provider associated with the device will report the new device capabilities to the service bus, and the service bus will in turn report the new device capabilities to the workflow front end. Thus, the new capabilities of the existing device will be available to the user for creating a new job ticket. Because a service provider of a newly-added device or a changed device can automatically report device capabilities to the service bus, devices can be efficiently added or changed.

Present workflow architectures do not allow for such flexibility in adding or changing devices. Present workflow architectures, which are implemented as customized software, require a change to the customized software in order to add or change devices, as the capabilities of the devices are coded into the software. The workflow architecture described herein advantageously does not require such a software change, because the services providers associated with the devices are able to report the capabilities of the devices to the service bus.

The invention may include other exemplary embodiments described below.

BRIEF DESCRIPTION OF THE DRAWINGS

The same reference number represents the same element or same type of element on all drawings.

FIG. 1 illustrates a workflow architecture in an exemplary embodiment of the invention.

FIG. 2 illustrates a workflow front end in an exemplary embodiment of the invention.

DETAILED DESCRIPTION OF THE DRAWINGS

Figure 3:
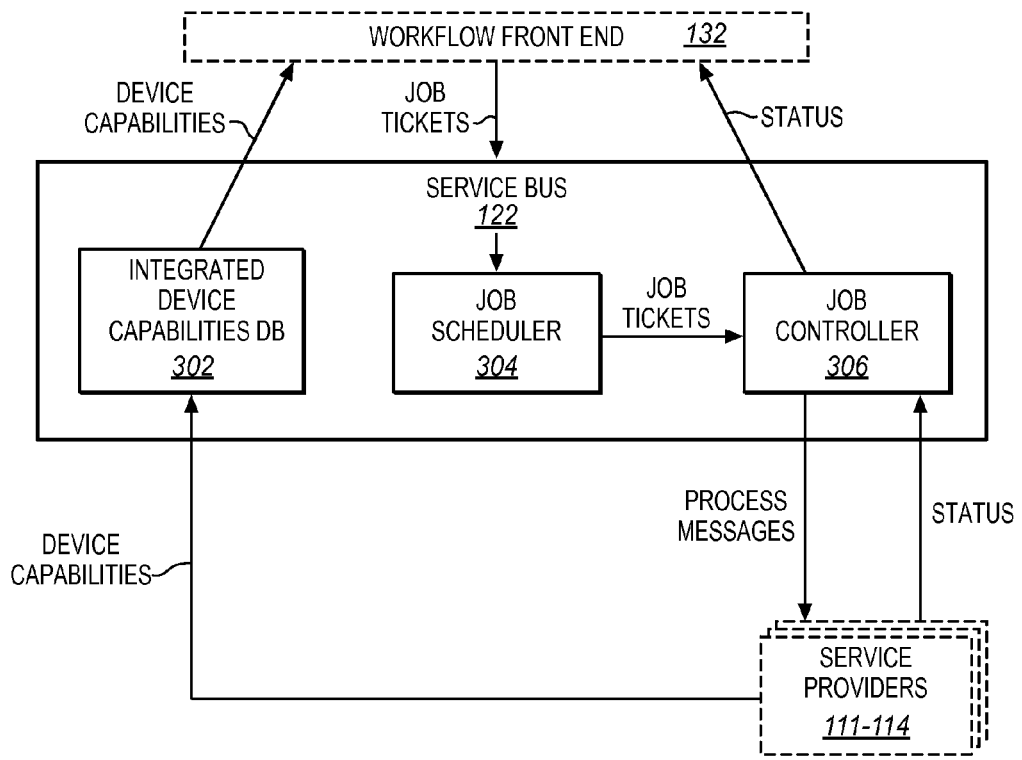
FIG. 3 illustrates a service bus in an exemplary embodiment of the invention.

FIGS. 1-11 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Workflow Architecture

FIG. 1 illustrates a workflow architecture 100 in an exemplary embodiment of the invention. Workflow architecture 100 may be implemented in a print shop. Workflow architecture 100 includes or is implemented with a plurality of devices 101-104 that are each operable to perform processes. For example, devices 101-104 may perform printing processes, cutting processes, binding processes, or other types of print shop processes. Although the term "device" commonly refers to a mechanical device operable to perform a process, the term "device" as used herein may also refer to humans that are able to perform processes. Devices 101-104 may be inline devices, near-line devices, or offline devices.

Workflow architecture 100 is implemented as a multi-layer platform in this embodiment. The first layer (Layer 1) is the device-level layer. Layer 1 is comprised of one or more service providers 111-114. Service providers 111-114 are each associated with a device 101-104. A service provider comprises any system, software, or module that is operable to monitor, store, and/or report capabilities of the devices 101-104. Device capabilities comprise any data or information that describes or indicates the activities, actions, or services offered by a device. The device capabilities may define the input resources for an activity offered by a device, the output resources for an activity offered by a device, and/or any operating parameters or device configuration used to perform an activity, action, or a service. Service providers 111-114 are able to determine, in real-time, the present capabilities of its associated device. For instance, service providers 111-114 may be operable to repeatedly monitor its associated device, such as by transmitting queries to the device or receiving updates from the device. By repeatedly monitoring the device capabilities of the device, a service provider 111-114 may thus determine the real-time device capabilities of the device. These real-time device capabilities may then be reported so that the architecture 100 always has the present or run-time device capabilities for all of the devices.

A service provider may also be operable to execute one or more processes using its associated device. For example, if a service provider is associated with a printer, then the service provider may be operable to execute a printing process on the printer.

The second layer (Layer 2) of the architecture 100 is a service bus 122. A service bus comprises any system, software, or module that is operable to store or integrate device capabilities for a print shop, and execute (manage) jobs, such as a print job. A print job comprises any task that defines one or more processes to be performed in a print shop. For example, a print job may define a printing process, a cutting process, a binding process, etc.

The third layer (Layer 3) of the architecture 100 is a workflow front end 132. A workflow front end comprises any system, software, or module that is operable to provide a user interface that allows a user to create a job ticket. The workflow front end is further operable to provide a user interface that allows the user to view the status of jobs being executed in service bus 122, and/or to manage the jobs in service bus 122. Although one workflow front end 132 is illustrated in FIG. 1, multiple workflow front ends may be implemented in other embodiments.

FIG. 2 illustrates a workflow front end 132 in an exemplary embodiment of the invention. In this embodiment, workflow front end 132 includes a job editor 202 and a workflow controller 204. Job editor 202 allows the user to create job tickets for print jobs or other types of jobs. Job editor 202 receives device capabilities of the devices 101-104 in the print shop from service bus 122 (as originally reported by each of service providers 111-114). Job editor 202 provides a user interface that displays the devices and their capabilities to the user. The user interface may comprise a graphical user interface (GUI) or another type of user interaction mechanism that allows the user to view information and enter instructions. For example, job editor 202 may provide a user interface that lists the devices 101-104 and the capabilities of the devices 101-104 to the user. Through the user interface, the user may define a job ticket for a job by selecting particular devices 101-104 and particular processes (or activities) to be performed by the devices 101-104. As an example, the user may select device 101 to print documents, and select device 102 to put a crease in the documents. Based on the input from the user in selecting devices and processes, job editor 202 generates a job ticket and transmits the job ticket to the service bus 122 for execution. Job editor 202 may also allow the user to set or change the configuration of devices 101-104.

One type of job ticket that may be used is a Job Definition Format (JDF) job ticket. A JDF job ticket is in XML format, and describes a job ticket, a message description, and message interchange. A JDF job ticket includes information that enables a device to determine what files are needed as input (if any), where the files are located, and what processes the device should perform. Other messages may be communicated in the workflow architecture 100 as Job Messaging Format (JMF) messages. JMF is part of the JDF specification. A JMF message is in XML format, and allows for communication of events (start, stop, error), status (available, offline, stalled, etc.), results (count, waste, etc.), and other details.

Workflow controller 204 provides user interface functions for service bus 122. When a user creates job tickets through job editor 202, the job tickets are transmitted to service bus 122 for execution. Service bus 122 schedules the job tickets for execution, and executes the job tickets as scheduled. Workflow controller 204 provides a user interface that displays the schedule of job tickets to the user, and also allows the user to change the schedule of job tickets. When a job ticket is executed in service bus 122, workflow controller 204 provides a user interface that displays the status. The user may also manage the job tickets that are being queued or executed in service bus 122.

FIG. 3 illustrates a service bus 122 in an exemplary embodiment of the invention. In this embodiment, service bus 122 includes an integrated device capability database 302, a job scheduler 304, and a job controller 306. Integrated device capability database 302 comprises any system, software, or module operable to receive a report or indication of device capabilities from service providers 111-114, and store the device capabilities. Integrated device capability database 302 may store the device capabilities in a device capability file that represents the entirety of the processes available. For instance, the device capabilities files may represent the entirety of the processes available (at run-time) in a print shop.

Integrated device capability database 302 may be further operable to register or unregister service providers 111-114 as needed or desired. For example, if a device 101-104 (see also FIG. 1) is taken out of service temporarily or permanently, then integrated device capability database 302 may unregister the service provider 111-114 for that device 101-104 while the device is out of service.

Job scheduler 304 comprises any system, software, or module operable to receive and store job tickets from workflow front end 132, and schedule the stored job tickets for execution. For example, the received job tickets may be JDF job tickets. Job scheduler 304 may schedule the job tickets according to an algorithm (e.g., first in first out), according to instructions from the operator, or according to some other method.

Job controller 306 comprises any system, software, or module operable to execute a job ticket (or a job defined by the job ticket). When job controller 306 receives a job ticket for execution as scheduled by job scheduler 304, job controller 306 is operable to identify the processes defined in the job ticket, and to identify the service providers 111-114 to perform the processes defined in the job ticket. Job controller 306 is also operable to generate process messages that request the identified processes be executed. A process message comprises any type of message that request or instructs a device to perform or execute one or more processes. In one example, the process message is a JDF job ticket. Job controller 306 is further operable to transmit the process messages to the identified service providers 111-114 so that the processes requested in the process messages may be executed.

Job controller 306 is also operable to receive the status of processes of a job ticket. Job controller 306 may modify a job ticket based on the status of one or more of the processes, such as by substituting one device 101-104 (see also FIG. 1) with another device (e.g., one of the devices 101-104 is unavailable to perform a process). Job controller 306 may also provide the status of the processes to workflow controller 204 (see FIG. 2) for display to a user.

Figure 4:
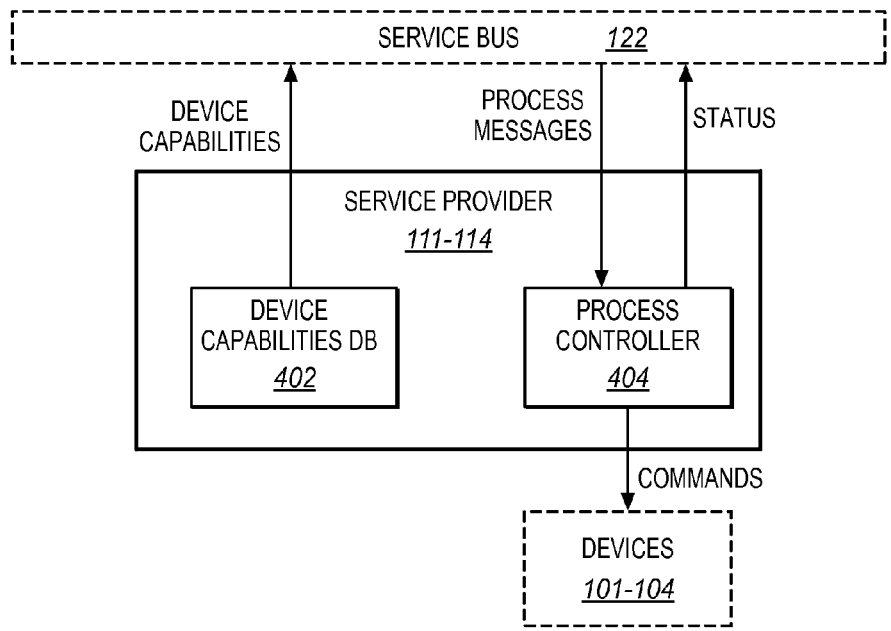
FIG. 4 illustrates a service provider in an exemplary embodiment of the invention.

FIG. 4 illustrates a service provider 111-114 in an exemplary embodiment of the invention. In this embodiment, service provider 111-114 includes a device capability database 402 and a process controller 404. Device capability database 402 comprises any system, software, or module operable to monitor the capabilities of a device 101-104 to determine its device capabilities, to store the device capabilities for a device 101-104 with which it is associated, and to report the device capabilities for a device 101-104 to service bus 122.

The device capabilities for a device 101-104 may be defined in a service provider 111-114 in a variety of ways. For example, the device manufacturer may define the device capabilities for a device according to a format set forth for workflow architecture 100. In another example, the manufacturer or provider of the workflow architecture may define service providers or device capabilities for multiple devices that may be part of a print shop. The appropriate service providers may then be activated if a new device is added to the print shop. In another example, an operator may dynamically define the device capabilities of a device, such as through workflow front end 132.

Process controller 404 comprises any system, software, or module operable to execute one or more processes on a device 101-104. When process controller 404 receives a process message from service bus 122, process controller 404 is operable to identify the process or processes to be executed in the process message, and execute the process or processes using its associated device 101-104. For example, if the process message comprises a JDF job ticket, then process controller 404 processes the JDF job ticket to identify what files are needed as input (if any), where the files are located, and what processes the device should perform. Process controller 404 may then convert the JDF job ticket into device-specific operational commands in the format compatible with its associated device 101-104, and transmit the device-specific operational commands to its associated device 101-104 to execute the process identified in the JDF job ticket.

Process controller 404 is also operable to monitor the status of a process or processes being performed on its associated device 101-104. Process controller 404 is also operable to report the status of the process(es) to service bus 122. Process controller 404 may use a JMF message to report the status of the processes to service bus 122.

This multi-layer workflow architecture 100 (see FIG. 1) advantageously provides a flexible platform for a print shop or for other applications. Because service providers 111-114 are able to report the device capabilities of devices 101-104 to service bus 122, that may, in turn provide them to workflow front end 132, the present or real-time capabilities of all of the devices 101-104 are available to the user when creating a job ticket. Thus, if a new device is added to the print shop for example, then the service provider associated with the new device will report the device capabilities of the new device to service bus 122, and the capabilities of the new device will be available to the operator when creating a job ticket. Similarly, if an existing device 101-104 is changed, then the service provider 111-114 associated with the changed device 101-104 will report the new device capabilities to service bus 122, and the capabilities of the changed device 101-104 will be available to the user when creating a job ticket. Because a service provider of a newly-added device or a changed device can automatically report device capabilities to the service bus, devices can be efficiently added or changed, such as in a print shop.

Method of Handling a Job Ticket

Figure 5:
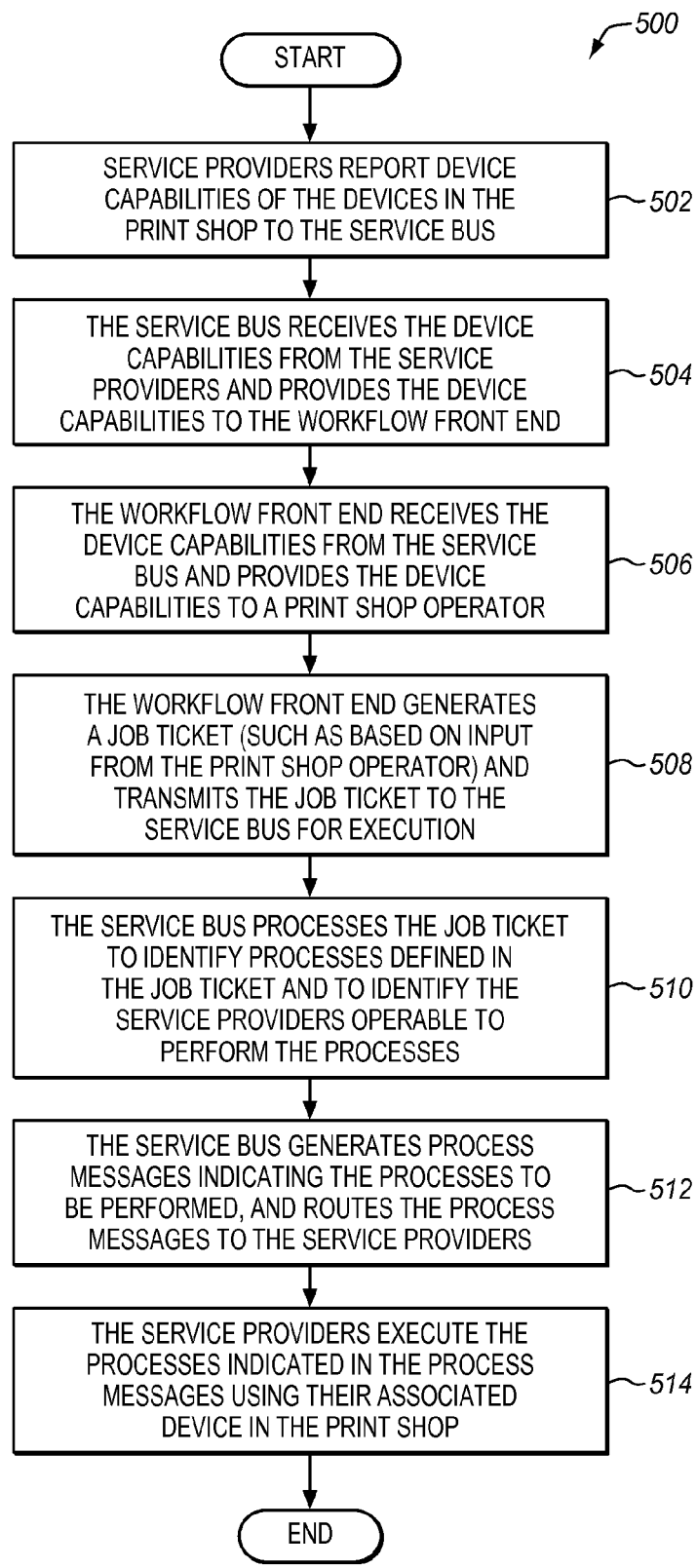
FIG. 5 is a flow chart illustrating a method of creating and executing a job ticket in an exemplary embodiment of the invention.

To illustrate how workflow architecture 100 operates in the print shop, FIG. 5 is a flow chart illustrating a method 500 of creating and executing a job ticket in an exemplary embodiment of the invention. The steps of method 500 will be described with reference to workflow architecture 100 in FIG. 1, although method 500 may be performed through other architectures and other devices in other embodiments. The steps of the flow chart in FIG. 5 are not all inclusive and may include other steps not shown.

As previously stated, service providers 111-114 store device capabilities for their associated devices 101-104, such as in device capabilities database 402 (see also FIG. 4). Service providers 111-114 each report the device capabilities of the devices 101-104 to service bus 122 in step 502. Service providers 111-114 may report the device capabilities according to one or more triggers. For instance, service providers 111-114 may report the device capabilities when their associated devices 101-104 are put into operation, or when a change is made to the device 101-104 or its operating parameters. Service providers 111-114 may alternatively report the device capabilities periodically, such as every minute, every hour, etc. Service providers 111-114 may alternatively report the device capabilities responsive to a request by service bus 122.

In step 504, service bus 122 receives the device capabilities from service providers 111-114. Integrated device capabilities database 302 (see also FIG. 3) may then integrate the device capabilities from each of the service providers 111-114 into an integrated device capability file for the print shop. The integrated device capability file represents the entirety of the processes available in the print shop. Integrated device capabilities database 302 monitors the device capabilities for devices 101-104. For example, integrated device capabilities database 302 may periodically query the service providers 111-114 to make sure the device capabilities are up to date. Service bus 122 also provides the device capabilities for the devices 101-104 in the print shop to workflow front end 132 in step 504.

In step 506, workflow front end 132 receives the device capabilities from service bus 122, such as in job editor 202 (see also FIG. 2). Job editor 202 then provides a user interface that displays or otherwise provides the device capabilities of the devices 101-104 to a print shop operator. This allows the print shop operator (or another user) to define a job ticket based on the device capabilities. Because the device capabilities indicate the devices 101-104 that are available and the activities, actions, or service offered by devices 101-104, the print shop operator (or other user) may select one or more of the devices 101-104 and one or more of the processes to be performed by the devices 101-104 as a subset of the device capabilities. Responsive to the input from the print shop operator, job editor 202 generates a job ticket for a print job in step 508. Because the job ticket is created based on the device capabilities of devices 101-104 in the print shop, the job ticket is virtually guaranteed to be executable on service bus 122. Workflow front end 132 then transmits the job ticket to service bus 122 also in step 508.

In one alternative, workflow front end 132 may generate a web page that indicates the device capabilities of devices 101-104 in the print shop. The web page generated by workflow front end 132 may be part of an online store provided by the print shop. A customer may then view the web page, and select one or more of the devices 101-104 and one or more of the processes to be performed by the devices 101-104 as a subset of the device capabilities. A job ticket may then be generated at the customer end, or may be generated in job editor 202 based on the selections by the customer. If the job ticket is generated at the customer end, then workflow front end 132 receives the generated job ticket from the customer over a network, such as the internet The job ticket generated by a customer may be in a proprietary format. Thus, if workflow front end 132 receives a job ticket from the customer in a proprietary format, the workflow front end 132 converts the job ticket in the proprietary format to a JDF job ticket. Workflow front end 132 may then transmit the JDF job ticket to service bus 122.

Service bus 122 receives the job ticket, such as in job scheduler 304 (see also FIG. 3). Job scheduler 304 schedules the job ticket according to an algorithm or input from a print shop operator. At some point, job scheduler 304 outputs the job ticket to job controller 306 for execution. Job controller 306 processes the job ticket to identify the processes defined in the job ticket, and to identify the service providers 111-114 operable to perform the processes in step 510. For instance, if the job ticket is in JDF format, then job controller 306 processes the JDF job ticket to identify the processes defined for the job. In step 512, job controller 306 generates process messages indicating the processes to be performed. Job controller 306 may, for each individual process, generate JDF job tickets indicating what files are needed as input (if any), where the files are located, and what process (or processes) the service provider 111-114 should perform. Job controller 306 then routes the process messages to service providers 111-114 in step 512.

One or more of the service providers 111-114 receive a process message from service bus 122. Through process controller 404 (see also FIG. 4), the service providers 111-114 that receive a process message execute the process (or processes) indicated in the process message using its associated device 101-104 in step 514. For example, if the process message is a JDF job ticket, then the service providers 111-114 may convert the JDF job ticket into device-specific operational commands in the format compatible with its associated device 101-104. Service providers 111-114 then transmit the device-specific operational commands to its associated device 101-104 to execute the process identified in the JDF job ticket.

Service providers 111-114 are each able to identify the status of the process executed using its associated device 101-104. Service providers 111-114 then transmit the status of the process to service bus 122. Service bus 122 transmits the status of the processes of the job to workflow front end 132. The status of the process may be transmitted in workflow architecture 100 in a JMF message. Workflow front end 132, such as through workflow controller 204, then indicates the status of the processes to the print shop operator. The print shop operator may then monitor the status of the entire job.

The print shop operator may manage or modify the job ticket that is being executed in service bus 122. For instance, if one of the devices 101-104 encounters an error or becomes unavailable, then the print shop operator may modify the job ticket to define a new device 101-104 or a new process. Similarly, service bus 122 may automatically modify the job ticket based on the status of the processes. If one of the devices 101-104 encounters an error or becomes unavailable, then service bus 122 is able to modify the job ticket to replace this device with another device in the print shop to perform the process.

EXAMPLE

Figure 6:
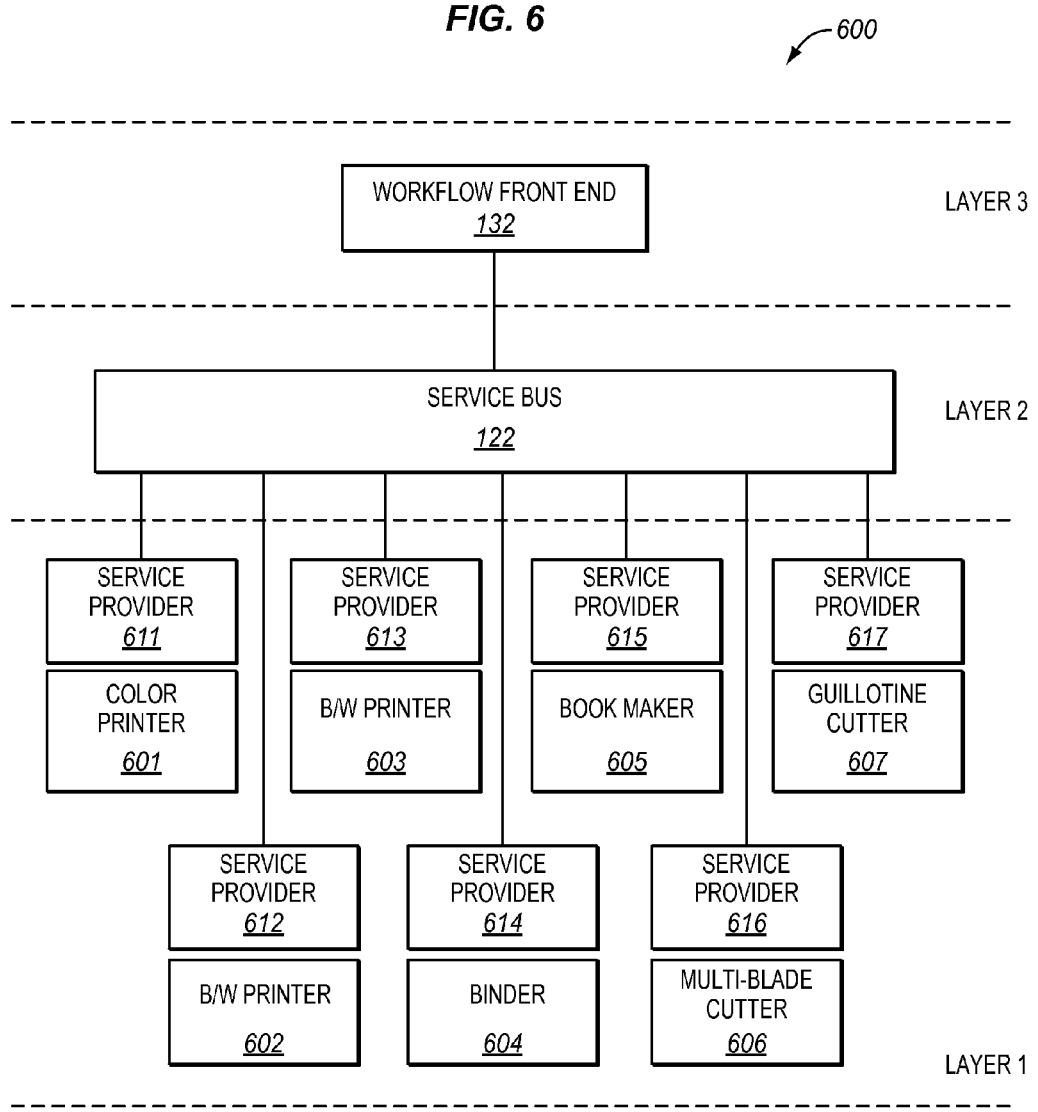
FIG. 6 illustrates another workflow architecture for a print shop in an exemplary embodiment of the invention.

FIGS. 6-9 illustrate an example of handling a particular job ticket in a print shop. The print shop in this example may use a workflow architecture similar to that shown in FIG. 1. FIG. 6 illustrates a workflow architecture 600 for the print shop in an exemplary embodiment of the invention. The print shop in this embodiment includes a color printer 601, a black and white printer 602 from a first vendor, and a black and white printer 603 from a second vendor. The print shop also includes a binder 604 and a book maker 605. The binder 604 and the book maker 605 are offline devices. The print shop also includes a multiple blade cutter 606 and a guillotine cutter 607. Both cutters 606-607 are near-line devices. Those skilled in the art will appreciate that a print shop may include more or less devices as desired.

Figure 11:
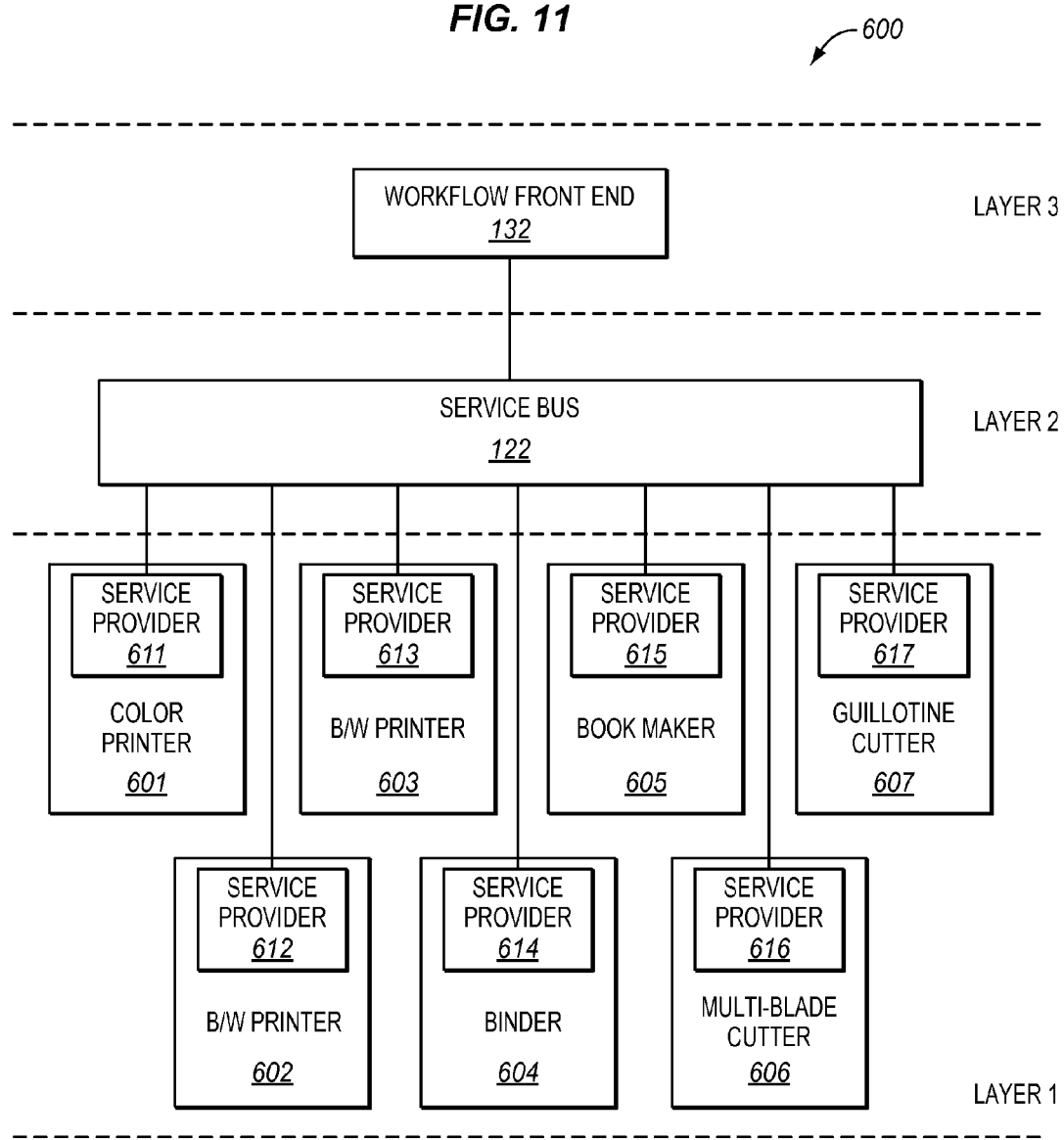
FIG. 11 illustrates a workflow architecture with service providers implemented within devices in an exemplary embodiment of the invention.

As with workflow architecture 100 shown in FIG. 1, workflow architecture 600 is implemented as a multi-layer platform having a plurality of service providers 611-617, a service bus 122, and a workflow front end 132. Service providers 611-617 are each associated with a device 601-607 in the print shop. Service provider 611 is associated with color printer 601 and stores the device capabilities for color printer 601. Service provider 612 is associated with black and white printer 602 and stores the device capabilities for black and white printer 602. Service provider 613 is associated with black and white printer 603 and stores the device capabilities for black and white printer 603. Service provider 614 is associated with the binder 604 and stores the device capabilities for binder 604. Service provider 615 is associated with the book maker 605 and stores the device capabilities for book maker 605. Service provider 616 is associated with the multiple blade cutter 606 and stores the device capabilities for cutter 606. Service provider 617 is associated with the guillotine cutter 607 and stores the device capabilities for cutter 607. Although the service providers in FIG. 6 are illustrated as external to its associated device, the service providers may be integrated within the devices. FIG. 11 illustrates workflow architecture 600 with the service providers 611-617 implemented within the devices 601-607.

At some point during operation, each service provider 611-617 reports the device capabilities for its associated device 601-607 to service bus 122 so that service bus 122 has real-time information on the device capabilities of each of devices in the print shop. The device capabilities may be provided in a declarative language, such as XML. For example, the following illustrates an example of the device capabilities of printer 602 for finishing as provided by service provider 612:

```
<DeviceCapabilities Name="FinishingParams">
    <EnumerationState Name="Collate" AllowedValueList="None Sheet"
DefaultValue="None"/>
    <EnumerationState Name="Sides" AllowedValueList="OneSidedFront TwoSidedFlipX
TwoSidedFlipY" DefaultValue="OneSidedFront"/>
    <XYPairState   Name="Resolution" AllowedValueList="600 600 1200
1200" DefaultValue="600 600"/>
    <BooleanState   Name="Staple" AllowedValueList="true false"
```

-continued

```
DefaultValue="false"/>
  <EnumerationState Name="StaplePosition" AllowedValueList="TopLeft
Left2 BottomLeft Bottom2 BottomRight Right2 TopRight Top2 Center2"
DefaultValue="TopLeft"/>
  <EnumerationState Name="StapleAngle" AllowedValueList="Vertical Horizontal Slant"
DefaultValue="Vertical"/>
  <BooleanState  Name="Punch" AllowedValueList="true false"
DefaultValue="false"/>
  <EnumerationState Name="PunchPosition" AllowedValueList="Top Left Bottom Right"
DefaultValue="Left"/>
  <EnumerationState Name="PunchNumHoles" AllowedValueList="2 3 4"
DefaultValue="2"/>
</DeviceCapabilities>
```

The following illustrates an example of the device capabilities of printer 602 for handling or providing different types of media (i.e., paper) as provided by service provider 612:

```
        <DeviceCapabilities Name="Media">
          <XYPairState Name="Dimension"
        AllowedValueList="595 842 612 792 792 1224"
        DefaultValue="612 792"/>
          <EnumerationState Name="MediaType"
        AllowedValueList="Plain Recycled Special
        Letterhead Bond Cardstock" DefaultValue="Plain"/>
          <NumberState Name="Weight"
        AllowedValueList="60~250"
        DefaultValue="60"/>
          <EnumerationState Name="Location"
        AllowedValueList="AutoSelect Tray1
        Tray2 Tray3 BypassTray" DefaultValue="AutoSelect"/>
        </DeviceCapabilities>
```

Service bus 122 receives the device capabilities from the service providers 611-617, and integrates the device capabilities into an integrated device capabilities database. The device capability database represents the entirety of the processes and devices available in the print shop. Service bus 122 then provides an integrated device capabilities file to workflow front end 132, such as responsive to a request from workflow front end 132.

Workflow front end 132, responsive to receiving the integrated workflow capabilities file, provides a user interface that displays or otherwise indicates actions or services that may be performed using devices 601-607 based on the device capabilities indicated in the integrated device capabilities file. Because the device capabilities indicate the devices 601-607 that are available and the processes that are available, the print shop operator may select one or more of the devices 601-607 and one or more of the processes performed by the devices 601-607 as a subset of the device capabilities. Assume for this embodiment that the print shop operator wants to create a bound instruction book.

To create the instruction book, the print shop operator may first select one of the printers 601-603 to print the instruction book, and may also indicate the printable file to be printed on the selected printer, such as a PDF file. Because the interior pages for the instruction book are in black and white, assume for this example that the print shop operator selects black and white printer 602 through the user interface to print the pages of the instruction book. The instruction book is also to be bound in some manner, so the print shop operator may next select binder 604 or bookmaker 605 through the user interface to bind the pages of the instruction book. Assume for this example that the print shop operator selects binder 604 through the user interface to bind the printed pages of the instruction book. The desired size of the instruction book may be smaller than the paper stock available in black and white printer 602, so the print shop operator may next select one of the cutters 606-607 to cut or trim the printed pages down to the correct size. Assume for this example that the print shop operator selects guillotine cutter 607 through the user interface to cut the bound, printed pages.

In addition to selecting the black and white printer 602, binder 604, and cutter 607 to perform particular processes, the print shop operator may view the operating parameters for these devices, and set or change the operating parameters as desired. For example, the print shop operator may select a particular type of paper stock from black and white printer 602. The print shop operator may set the cutting parameters for cutter 607. The adjustable parameters for each of the devices will be displayed by workflow front end 132 through the user interface.

Responsive to the input from the print shop operator, workflow front end 132 generates a job ticket for a job. Because the job ticket is created based on the device capabilities of black and white printer 602, binder 604, and cutter 607, the job ticket is virtually guaranteed to be executable on service bus 122. In this example, the job ticket comprises a JDF job ticket. The JDF job ticket describes the processes that are to be performed by black and white printer 602, binder 604, and cutter 607. The JDF job ticket also includes a location of the PDF file for the instruction book. Workflow front end 132 then transmits the JDF job ticket to service bus 122.

Service bus 122 receives the JDF job ticket, and processes the JDF job ticket to identify the processes defined for the job. Service bus 122 also identifies the service providers 611-617 operable to perform the processes, which are service providers 612, 614, and 617. Service bus 122 then generates another JDF job ticket or re-uses the JDF job ticket for each of the service providers 612, 614, and 617. The JDF job tickets each indicate what files are needed as input (if any), where the files are located, and what process (or processes) should be performed. Service bus 122 then routes a JDF job ticket to service provider 612 (which is associated with black and white printer 602).

Service provider 612 receives the JDF job ticket from service bus 122. The JDF job ticket is written in XML format. For example, the following illustrates an example of an excerpt of the JDF job ticket transmitted to service provider 612 which indicates the type of finishing to perform:

```
<JobTicket>
   <DigitalPrintingParams Collate="Sheet"/>
   <LayoutPreparationParams Sides="TwoSidedFlipX"/></JobTicket>
<JobTicket>
```

Figure 7:
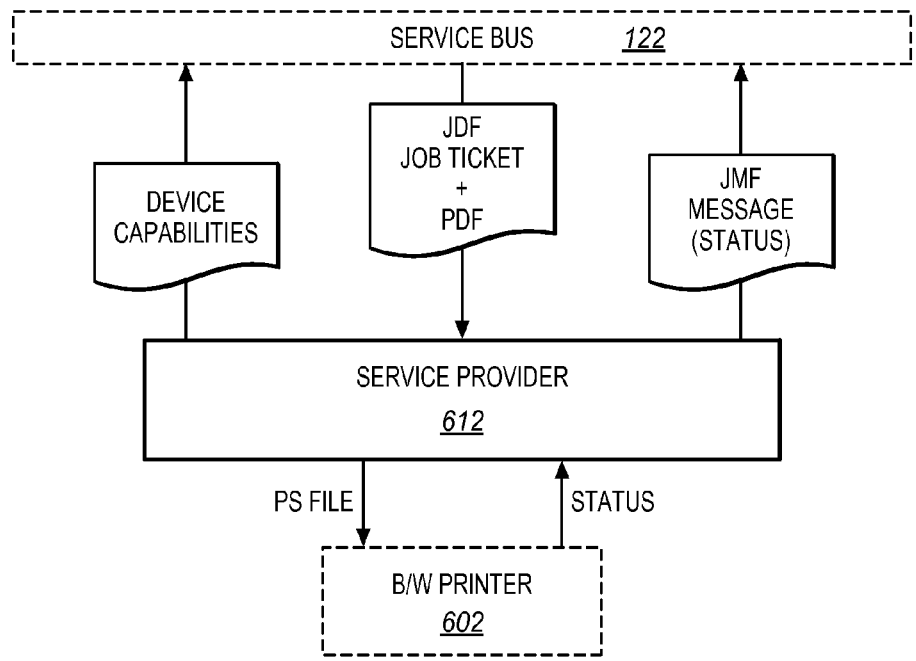
FIG. 7 illustrates messages exchanged between a service provider for a printer and a service bus in an exemplary embodiment of the invention.

FIG. 7 illustrates the messages exchanged between service provider 612 and service bus 122 in an exemplary embodiment of the invention. Service provider 612 receives the JDF job ticket and the PDF file from service bus 122. The JDF job ticket requests that service provider 612 execute a printing process on black and white printer 602 to print the PDF file. Thus, service provider 612 converts the JDF job ticket into device-specific operational commands in the format compatible with black and white printer 602. For example, service provider may convert the PDF file and the JDF job ticket into a PostScript (PS) file. Service provider 612 then transmits the PostScript file to black and white printer 602, and black and white printer 602 prints the PostScript file.

Service provider 612 also monitors the status of the printing process on black and white printer 602. To report the status to service bus 122, service provider 612 transmits a JMF message back to service bus 122 indicating the status so that service bus 122 may monitor the overall status of the print job. For example, service provider 612 may transmit a JMF message indicating when the printing process has ended.

After the printing process has been completed, the output from black and white printer 602 comprises printed pages for the instruction book. The next step in the workflow is to bind the printed pages. Because binder 604 is an offline device, the output from black and white printer 602 is not automatically sent to binder 604 as input. Thus, service bus 122 instructs the print shop operator to manually insert the printed pages in binder 604. Service bus 122 also routes a JDF job ticket to service provider 614 (which is associated with binder 604).

Figure 8:
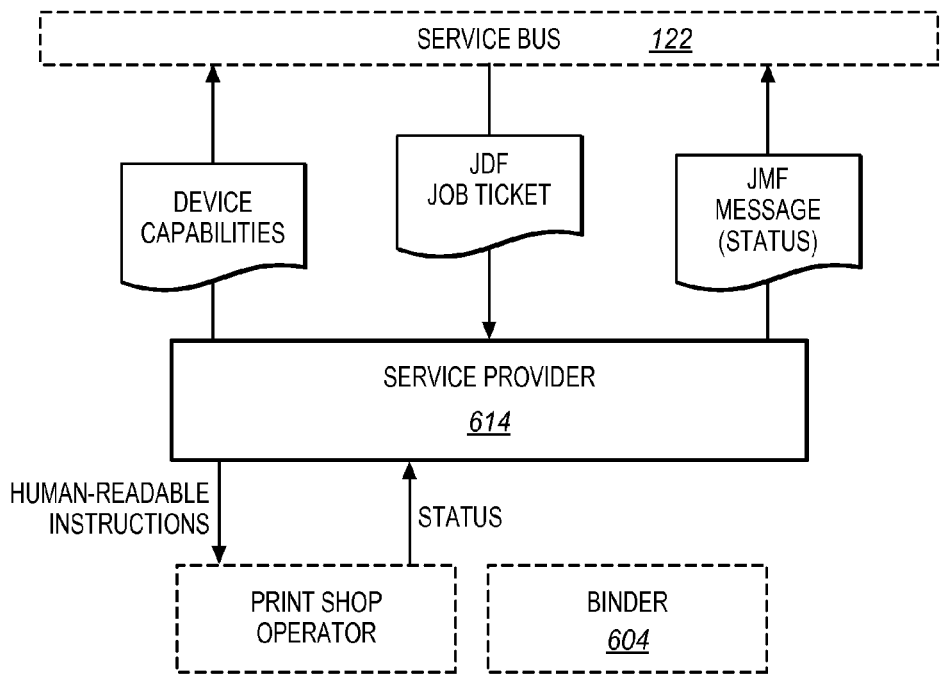
FIG. 8 illustrates messages exchanged between a service provider of a binder and a service bus in an exemplary embodiment of the invention.

FIG. 8 illustrates the messages exchanged between service provider 614 and service bus 122 in an exemplary embodiment of the invention. Service provider 614 receives the JDF job ticket from service bus 122. The JDF job ticket requests that service provider 614 execute a binding process on binder 604 to bind the printed pages for the instruction book. Because binder 604 is an offline device, service provider 614 is not able to provide device-specific operational commands to binder 604. Instead, service provider 614 generates human-readable instructions which instruct the print shop operator how to configure and operate binder 604. The print shop operator then follows the instructions from service provider 614 to operate binder 604.

Service provider 614 also monitors the status of the binding process on binder 604. Service provider 614 may rely on input from the print shop operator as the status of the binding process (e.g., completed or not completed). Service provider 614 then transmits a JMF message back to service bus 122 indicating the status so that service bus 122 may monitor the overall status of the print job. For example, service provider 614 may transmit a JMF message indicating when the binding process has been completed.

After the binding process has been completed, the output from binder 604 comprises bound, printed pages for the instruction book that have to be cut to the appropriate size. The next step in the workflow is to cut the bound, printed pages down to the desired size. Because cutter 607 is a near-line device, the output from binder 604 is not automatically sent to cutter 607 as input. Thus, service bus 122 instructs the print shop operator to manually insert the bound, printed pages in cutter 607. Service bus 122 also routes a JDF job ticket to service provider 617 (which is associated with cutter 607).

Figure 9:
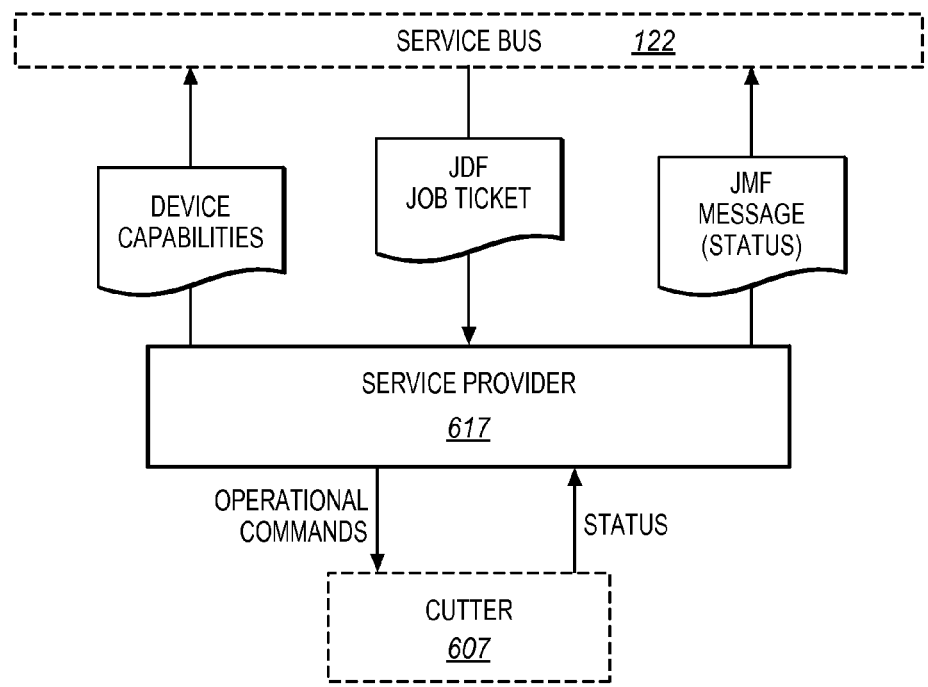
FIG. 9 illustrates messages exchanged between a service provider for a cutter and a service bus in an exemplary embodiment of the invention.

FIG. 9 illustrates the messages exchanged between service provider 617 and service bus 122 in an exemplary embodiment of the invention. Service provider 617 receives the JDF job ticket from service bus 122. The JDF job ticket requests that service provider 617 execute a cutting process on cutter 607 to cut the bound, printed pages for the instruction book. Thus, service provider 617 converts the JDF job ticket into device-specific operational commands in the format compatible with cutter 607, and transmits the device-specific operational commands to cutter 607. Cutter 607 then executes the operational commands to cut the bound, printed pages.

Service provider 617 also monitors the status of the cutting process on cutter 607. Service provider 617 transmits a JMF message back to service bus 122 indicating the status so that service bus 122 may monitor the overall status of the print job. For example, service provider 617 may transmit a JMF message indicating when the cutting process has been completed.

After the cutting process has been completed, the output from cutter 607 comprises a completed, bound instruction book. Service bus 122 may then execute the print job again to generate another copy of the instruction book as desired.

The print shop operator may manage or modify the job that is being executed in service bus 122. For instance, if black and white printer 602 encounters an error or becomes unavailable, then the print shop operator may modify the job ticket to utilize black and white printer 603 instead. Service bus 122 then stores the modified job ticket.

CONCLUSION

Figure 10:
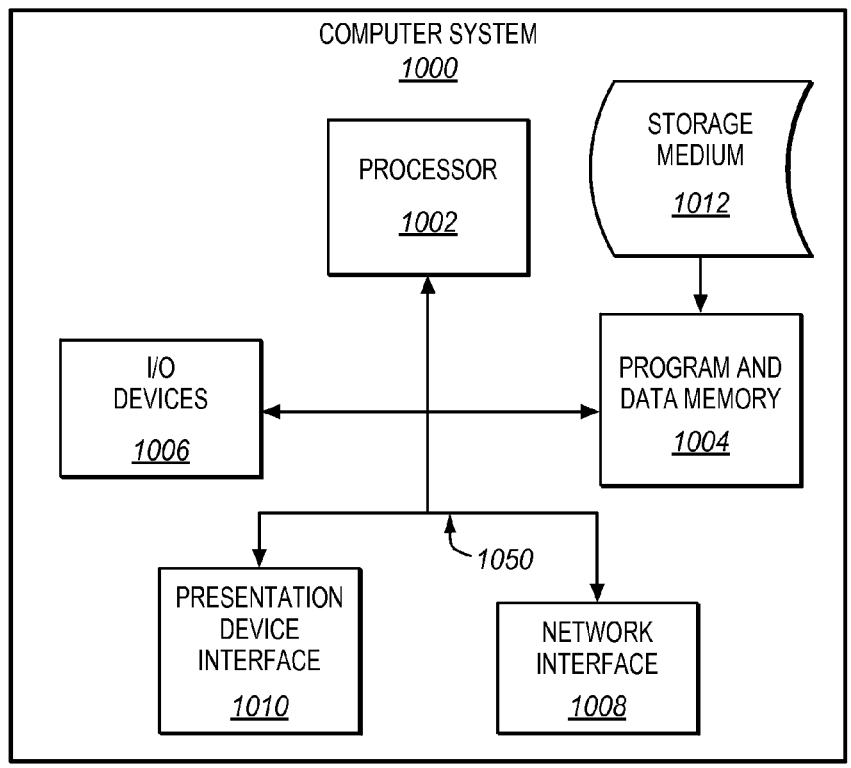
FIG. 10 illustrates a computer system operable to execute computer readable medium embodying programmed instructions to perform desired functions in an exemplary embodiment of the invention.

Embodiments of the invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 10 is a block diagram depicting a computer system 1000 operable to provide features and aspects hereof by executing programmed instructions and accessing data stored on a computer readable storage medium 1012.

Furthermore, embodiments of the invention can take the form of a computer program product accessible from a computer-usable or computer-readable medium 1012 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A computer system 1000 suitable for storing and/or executing program code will include at least one processor 1002 coupled directly or indirectly to memory elements 1004 through a system bus 1050. The memory elements 1004 can include local memory employed during actual execution of the program code, bulk storage, and cache memories which provide temporary storage of at least some program code in order to reduce the number of times code must be retrieved from bulk storage during execution.

Input/output or I/O devices 1006 (including but not limited to keyboards, displays, pointing devices, etc) can be coupled to the system either directly or through intervening I/O controllers. Network adapter interfaces 1008 may also be coupled to the system to enable the computer system 1000 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 1010 may be coupled to the system to interface to one or more presentation device such as printing systems and displays for presentation of presentation data generated by processor 1002.

Although specific embodiments were described herein, the scope of the invention is not limited to those specific embodiments. The scope of the invention is defined by the following claims and any equivalents thereof.

We claim:

1. A multi-layer print workflow architecture system, comprising:
    service providers that are associated with devices;
    a service bus; and
    a print workflow front end;
    the service providers operable to repeatedly monitor the capabilities of their associated devices to determine real-time device capabilities of the devices, and to repeatedly report the real-time device capabilities of their associated devices to the service bus;
    the service bus operable to receive the real-time device capabilities from the service providers, and to provide the real-time device capabilities for the devices to the print workflow front end;
    the print workflow front end including a processor, the processor operable to receive the real-time device capabilities from the service bus, and to provide the real-time device capabilities to a user to allow the user to define a job ticket based on the real-time device capabilities of the devices, wherein the job ticket defines one or more processes to be performed by the devices;
    the print workflow front end is further operable to receive input from the user selecting the processes as a subset of the real-time device capabilities, to generate the job ticket based on the input from the user, and to transmit the job ticket to the service bus; and
    the service bus is further operable to process the job ticket to identify the processes defined in the job ticket, to identify the service providers operable to perform the processes, to generate process messages indicating the processes to be performed, and to route the process messages to the identified service providers.

2. The multi-layer print workflow architecture system of claim 1 wherein:
    the identified service providers are further operable to receive a process message, and to execute the process indicated in the process message on their associated devices.

3. The multi-layer print workflow architecture system of claim 2 wherein:
    the identified service providers are further operable to identify the status of the processes, and to transmit the status of the processes to the service bus;
    the service bus is further operable to transmit the status of the processes to the print workflow front end; and
    the print workflow front end is further operable to provide the status of the processes to the user.

4. The multi-layer print workflow architecture system of claim 3 wherein:
    the service bus is further operable to modify the job ticket based on the status of a process to replace at least one of the devices identified to perform the process with another device.

5. The multi-layer print workflow architecture system of claim 2 wherein:
    the process messages comprise Job Definition Format (JDF) job tickets; and
    the identified service providers are further operable to convert a JDF job ticket into device-specific operational commands in a format compatible with its associated device, and to transmit the device-specific operational commands to its associated device to execute the process identified in the JDF job ticket.

6. The multi-layer print workflow architecture system of claim 1 wherein:
    the print workflow front end is further operable to generate a web page indicating the real-time device capabilities of the devices, and to receive the job ticket from a customer having accessed the web page.

7. The multi-layer print workflow architecture system of claim 6 wherein:
    the print workflow front end is further operable to receive the job ticket from the customer in a proprietary format, and to convert the job ticket in the proprietary format to a Job Definition Format (JDF) job ticket.

8. A method of handling a job ticket on a multi-layer print workflow architecture, wherein the print workflow architecture includes service providers that are associated with devices, includes a service bus, and includes a print workflow front end, the method comprising:
    repeatedly monitoring, in the service providers, the capabilities of their associated devices to determine real-time device capabilities of the devices;
    repeatedly reporting the real-time device capabilities of the devices from the service providers associated with the devices to the service bus;
    receiving the real-time device capabilities in the service bus from the service providers;
    providing the real-time device capabilities for the devices to the print workflow front end;
    receiving the real-time device capabilities in the print workflow front end from the service bus;
    providing the real-time device capabilities to a user through the print workflow front end to allow the user to define the job ticket based on the real-time device capabilities of the devices, wherein the job ticket defines one or more processes to be performed by devices;
    receiving input from the user selecting the processes as a subset of the real-time device capabilities;
    generating the job ticket in the print workflow front end based on the input from the user;
    transmitting the job ticket from the print workflow front end to the service bus;
    processing the job ticket in the service bus to identify the processes defined in the job ticket, and to identify the service providers operable to perform the processes;
    generating process messages indicating the processes to be performed; and
    routing the process messages from the service bus to the identified service providers.

9. The method of claim 8 further comprising:
receiving a process message in an identified service provider; and
executing, in the identified service provider, the process indicated in the process message on its associated device.

10. The method of claim 9 further comprising:
identifying the status of the processes in the identified service providers;
transmitting the status of the processes from the identified service providers to the service bus;
transmitting the status of the processes from the service bus to the print workflow front end; and
providing, in the print workflow front end, the status of the processes to the user.

11. The method of claim 10 further comprising:
modifying the job ticket in the service bus based on the status of a process to replace at least one of the devices identified to perform the process with another device.

12. The method of claim 9 wherein:
the process messages comprise Job Definition Format (JDF) job tickets; and
executing, in the identified service provider, the process indicated in the process message on its associated device comprises:
converting a JDF job ticket into device-specific operational commands in a format compatible with its associated device; and
transmitting the device-specific operational commands to its associated device to execute the process identified in the JDF job ticket.

13. The method of claim 8 further comprising:
generating a web page through the print workflow front end indicating the real-time device capabilities of the devices; and
receiving the job ticket from a customer having accessed the web page.

14. The method of claim 13 further comprising:
receiving the job ticket from the customer in a proprietary format; and
converting the job ticket in the proprietary format to a Job Definition Format (JDF) job ticket.

15. A non-transitory computer readable medium tangibly embodying programmed instructions which, when executed by a computer system, are operable to define a print workflow architecture that comprises:
service providers that are associated with devices;
a service bus; and
a print workflow front end;
the programmed instructions when executed by the computer system are further operable to perform a method for handling a job ticket in the print workflow architecture, the method comprising:
repeatedly monitoring, in the service providers, the capabilities of their associated devices to determine real-time device capabilities of the devices;
repeatedly reporting real-time device capabilities of the devices from the service providers associated with the devices to the service bus;
receiving the real-time device capabilities in the service bus from the service providers;
providing the real-time device capabilities for the devices to the print workflow front end;
receiving the real-time device capabilities in the print workflow front end from the service bus;
providing the real-time device capabilities to a user through the print workflow front end to allow the user to define a job ticket based on the real-time device capabilities of the devices, wherein the job ticket defines one or more processes to be performed by devices;
receiving input from the user selecting the processes as a subset of the real-time device capabilities;
generating the job ticket in the print workflow front end based on the input from the user;
transmitting the job ticket from the print workflow front end to the service bus;
processing the job ticket in the service bus to identify the processes defined in the job ticket, and to identify the service providers operable to perform the processes;
generating process messages indicating the processes to be performed; and
routing the process messages from the service bus to the identified service providers.

16. The non-transitory computer readable medium of claim 15 wherein the programmed instructions, when executed by the computer system, are further operable to perform the method steps of:
receiving a process message in an identified service provider; and
executing, in the identified service provider, the process indicated in the process message on its associated device.

17. The non-transitory computer readable medium of claim 16 wherein the programmed instructions, when executed by the computer system, are further operable to perform the method steps of:
identifying the status of the processes in the identified service providers;
transmitting the status of the processes from the identified service providers to the service bus;
transmitting the status of the processes from the service bus to the print workflow front end; and
providing, in the print workflow front end, the status of the processes to the user.

18. The non-transitory computer readable medium of claim 15 wherein the programmed instructions, when executed by the computer system, are further operable to perform the method steps of:
generating a web page through the print workflow front end indicating the real-time device capabilities of the devices; and
receiving the job ticket from a customer having accessed the web page.

19. The non-transitory computer readable medium of claim 18 wherein the programmed instructions, when executed by the computer system, are further operable to perform the method steps of:
receiving the job ticket from the customer in a proprietary format; and
converting the job ticket in the proprietary format to a Job Definition Format (JDF) job ticket.

20. The non-transitory computer readable medium of claim 15 wherein the programmed instructions, when executed by the computer system, are further operable to perform the method steps of:
modifying the job ticket in the service bus based on the status of a process to replace at least one of the devices identified to perform the process with another device.

* * * * *